July 16, 1968     J. K. LA FLEUR ET AL     3,392,804
LUBRICATION SYSTEM
Filed June 29, 1965     2 Sheets-Sheet 2
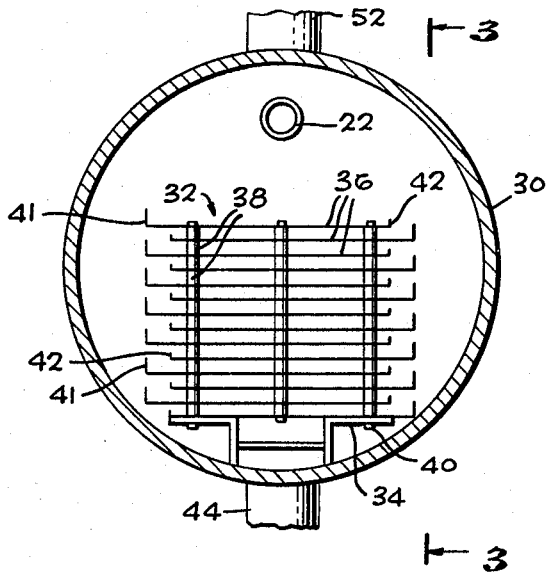
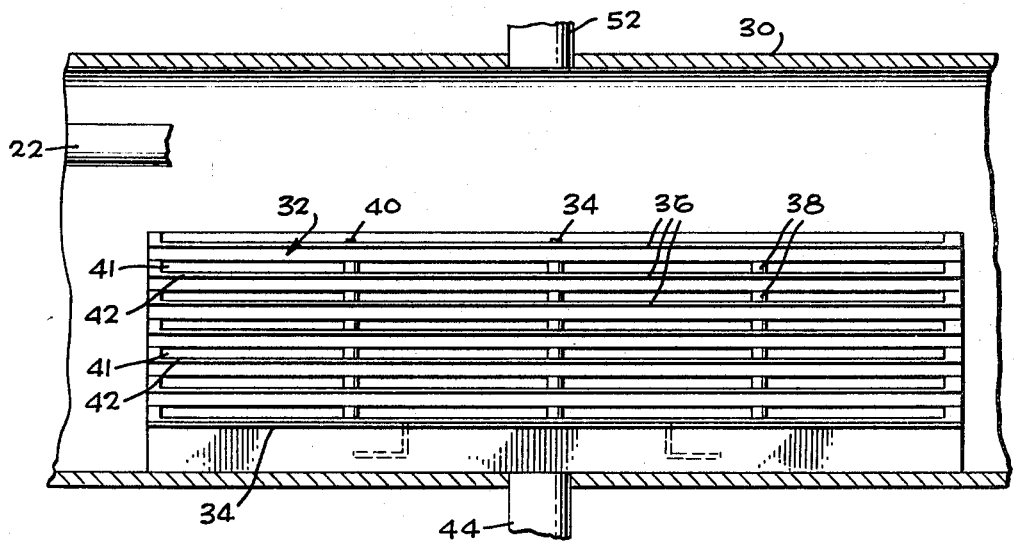
INVENTORS
JAMES K. LA FLEUR
ANGEL R. FLOREZ
BY
ATTORNEY United States Patent Office 3,392,804
Patented July 16, 1968

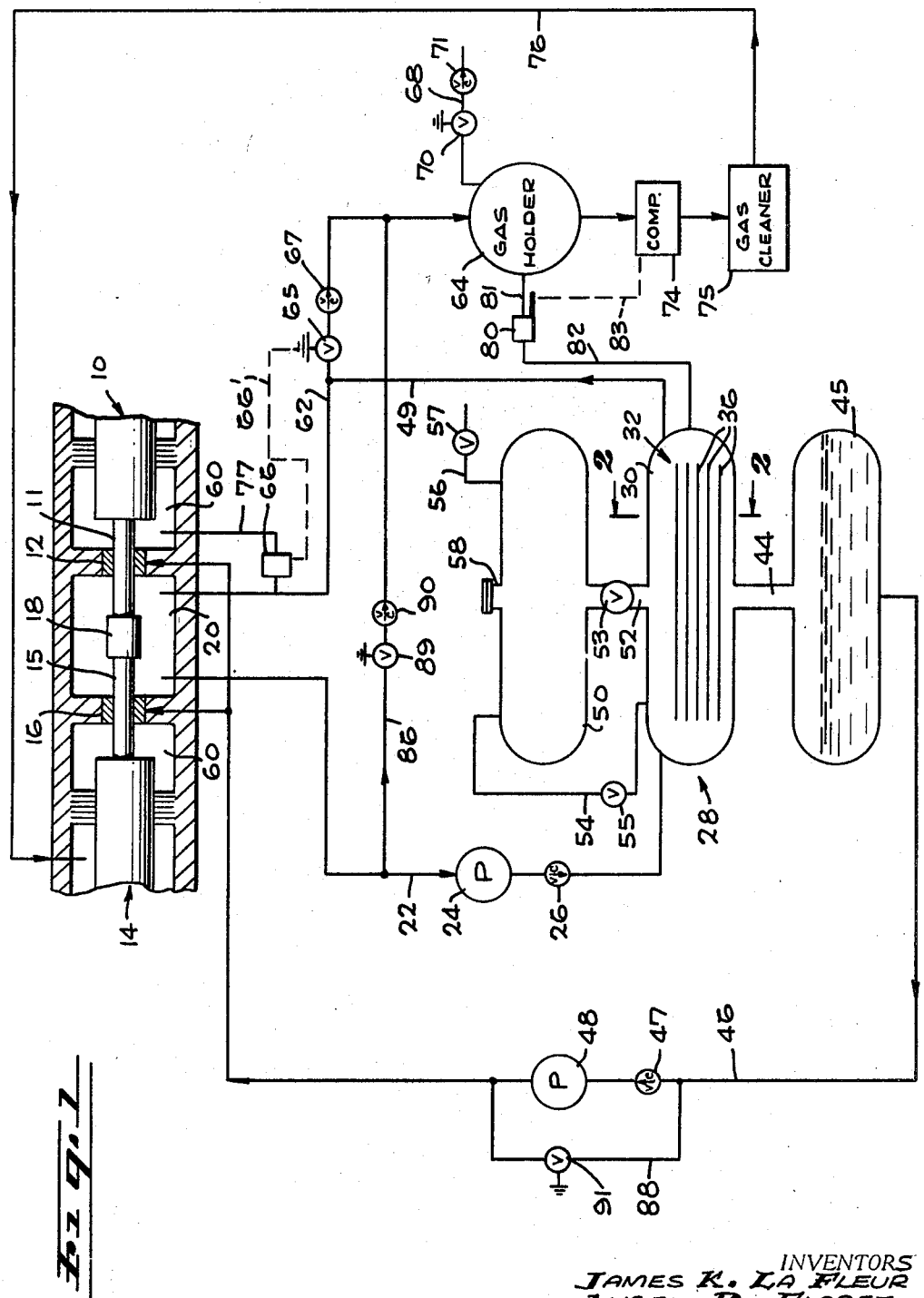

3,392,804
LUBRICATION SYSTEM
James K. La Fleur, Hermosa Beach, and Angel R. Florez, Downey, Calif., assignors, by mesne assignments, to McDonnell Douglas Corporation, Santa Monica, Calif., a corporation of Maryland
Filed June 29, 1965, Ser. No. 468,010
8 Claims. (Cl. 184—6)

ABSTRACT OF THE DISCLOSURE

Oil lubrication system for the bearings of turbomachinery operating with a gaseous medium, said system being pressurized and normally operating in a closed circuit, including means providing passage of any of the gaseous medium which leaks through the seals or bearings, into the scavenge oil cavity, means for efficient separation of working gas, e.g., helium, from the lubricating oil collected in the scavenge oil cavity, means preventing a high concentration of working gas in the scavenge oil cavtiy, and for recirculating excess gas to the system, and an emergency lubrication system, including a series of by-pass lines and valves in the oil lubrication system which operate to prevent extensive damage to the turbomachinery in the event of a power failure causing the oil pumps to stop functioning, by permitting the oil under pressure in the oil and gas separation system, to be forced through the bearings of the turbomachinery and through an outlet to the atmosphere.

---

This invention relates to a lubrication system particularly designed for closed cycle turbomachines, and is especially concerned with a novel system for removing gas or gas bubbles from the oil lubrication system of turbomachinery operating on a closed gas cycle, employing a relatively expensive gaseous working medium such as helium, and recirculation of the separated gas to the turbomachines system, and including certain novel and advantageous operating and safety features.

In prior art oil lubrications systems for turbomachinery, including for example, power turbines and turbo compressors, employing air as the gaseous working medium, the oil tank supplying lubricating oil to the bearings and rotating shafts, is generally open to the atmosphere. Thus, any of the compressed working medium or air which escapes through the seals or bearings of the turbomachinery and into the circulating oil lubricant which passes to the oil tank, merely escapes to the atmosphere. Also, in conventional turbomachinery of this type a hole or aperture is generally provided in the turbomachinery casing which communicates with the scavenge oil cavity and venting the cavity to the atmosphere.

However, in closed cycle turbomachinery employing an expensive gaseous medium such as helium, e.g., in a power-refrigeration system as described in the copending application Ser. No. 318,564, filed Oct. 24, 1963 by James K. La Fleur, now Patent No. 3,194,026, and wherein such helium is employed both as a power medium and as a refrigerant, it is particularly desirable to avoid loss of this working medium by escape thereof via the oil lubricating system. It is also important in systems of this type to prevent contamination of the gaseous working medium by the lubricating fluid.

One object of the invention accordingly is the provision of a lubricating system for closed cycle turbomachinery which separates bubbles of gaseous working medium from the lubricating fluid, and which recirculates substantially gas-free lubricant fluid or oil to the turbomachinery bearings, and returns the separated gaseous working medium to the turbomachinery system.

Another object of the invention is to provide a device to facilitate separation or removal of bubbles of gas in a lubricant fluid or oil, particularly in the above system.

Another object of the invention is the provision of a lubrication system for closed cycle turbomachinery, particularly employing an expensive gaseous medium, e.g., helium, which is designed to prevent leakage of the working medium to the atmosphere in normal operation, and including means which prevent contamination of the working medium by the lubricant.

A still further object of the invention is to provide in a closed cycle turbomachine system employing a circulating pressurized lubricating system, an emergency lubrication system so that when a power failure occurs causing a sudden shutdown of the lubricating oil pump system, lubricating oil will be circulated or forced through the rotating turbomachinery for a sufficient time to permit the turbomachinery to be stopped before any material damage occurs.

Other objects and advantages of the invention will appear hereinafter.

According to one feature of the invention system, an oil separator system is provided in a circulating oil lubricant system which circulates lubricant oil including therein any gaseous medium such as helium, under pressure from the scavenge oil cavity of a turbomachinery system, into an oil sperator device which removes the gas bubbles from the oil, and circulates the substantially gas-free oil lubricant under pressure back to the bearing and rotating portions of the turbomachinery for lubrication thereof. The oil separator device includes an oil separator tank which contains a system of vertically spaced plates designed to provide a cascading descending path of flow of the mixture of oil and gas introduced onto said plates, so that the oil cascading from the upper plates to the lower plates is gradually stripped of the gaseous content thereof, whereby the oil which finally leaves the lower plate is substantially gas-free and is then recirculated for the lubrication of the turbomachinery. The gas so separated from the oil is returned to the turbomachinery system.

The lubricating oil system of the invention includes means for providing passage of any of the gaseous medium which leaks through the seals or bearings of the turbomachinery, into the scavenge oil cavity and including means for removing excess gas which accumulates in the scavenge cavity. The latter means comprises means for automatically operating a valve for withdrawal of excess gas from the scavenge oil cavity to a gas holder, and which is designed to be actuated by sensing of a pressure below a set minimum differential pressure between the balance cavity and the oil scavenge cavity. Means including a scavenge cavity compressor, is provided to withdraw gas from the gas holder and return such gas to the closed working cycle for the turbomachinery, when the gas pressure in the gas holder reaches a predetermined value in relation to the gas pressure in the oil separator tank or in the scavenge oil cavity. Such gas withdrawal means comprises means associated with the gas holder and the oil separator tank, the latter having a pressure substantially corresponding to the pressure in the scavenge oil cavity, for actuation of the scavenge gas compressor to withdraw gas from the gas holder, when a pressure below a minimum predetermined differential pressure is sensed between the oil separator tank and such gas holder.

There is also provided as another important feature of the invention an emergency lubrication system consisting of a series of by-pass lines and valves located at appropriate positions in the oil lubrication system, such valves being closed during normal operation of the oil lubricating system, and normal operation of the turbomachinery, but being actuated to open upon failure of power to the oil pumping system which includes, for example, the scavenge oil pump for circulating oil from the scavenge cavity to the oil separator tank, and the oil feed pump for recirculatnig the oil to the turbomachinery bearings, to thereby permit the oil under pressure in the oil separator system to be forced through the bearings of the turbomachinery and then through the oil scavenge cavity and through an outlet to the atmosphere externally of the machinery. This provides a sufficient time period of lubrication of the turbomachinery bearings to permit the turbomachinery to come to a non-rotating position, and preventing major damage to the machine in terms of bearing failure or seizure, and possible twisting of the shaft.

The invention will be more clearly understood by reference to the description below of a certain preferred embodiment taken in connection with the accompanying drawing wherein:

FIG. 1 is a schematic flow diagram of the lubrication system of the invention;

FIG. 2 is a cross-sectional view of the oil separator tank, taken on line 2—2 of FIG. 1, showing the system of plates providing a cascading downward flow of the oil and gas mixture therein; and FIG. 3 is a longitudinal side view of the system of cascading plates disposed within the oil separator tank, shown in FIG. 2.

Referring to FIG. 1, numeral 10 illustrates a turbine having a rotatable shaft 11 mounted in a bearing assembly 12, and numeral 14 repersents a turbo compressor whose shaft 15 is mounted in a bearing assembly 16. It will be understood that the opposite end of the turbine shaft 11, and the opposite end of the compressor shaft 15 are each mounted in a bearing assembly similar to 12 and 16. The turbine shaft and the compressor shaft are joined together by means of a splined sleeve 18 for the transfer of power from the turbine to the compressor. The turbine and compressor may be axial or radial flow machines, and may be multistaged and of the type described in the copending application Ser. No. 273,910, filed Apr. 18, 1963 by James K. La Fleur, now Patent No. 3,201,941, and employed in a power, or power-refrigeration system employing helium as the working medium in both the turbine and compressor. If desired, more than two turbomachines, e.g., two turbines and a compressor, can be mounted for rotation on a common axis as described in the above last mentioned application.

Seals (not shown) are provided at the ends of the shaft of both the turbine and compressor and adjacent the bearings 12 and 16 thereof, as described in the last mentioned copending application, to reduce leakage of gas from the various blade passages of the turbine and compressor. The bearing units 12 and 16 are supplied with oil under pressure by the lubrication system described in detail below, and the oil scavenge cavity 20 provided between the adjacent bearing units of the turbine and compressor serves to collect the oil from the adjacent bearing units. The lubricating oil circulation system for the bearings operates under relatively high pressure, e.g., of the order of about 200 p.s.i.

Usually, after a period of opertion, gas leakage, e.g., helium gas working medium employed in the turbine and compressor, occurs through the seals and the bearings 12 and 16, and such leakage is caused to occur, in the manner more fully described hereinafter, in a direction of flow from both the turbine and compressor, into the oil scavenge cavity 20. The mixture of gas, e.g., helium gas bubbles, in the oil collecting in the oil scavenge cavity is circulated in an external system so as to remove the gas bubbles from the oil, and recirculate the oil to the bearings, and to return the separated gas to the oil scavenge cavity according to the invention in the following manner, and by means of the system shown in FIG. 1.

Thus, the mixture of lubricating oil and gas is withdrawn from the scavenge cavity through an oil scavenging line 22 and pumped by means of the scavenge oil pump 24 past a check valve 26 preventing reverse flow of the oil and gas mixture, into an oil separator system generally indicated at 28. This oil separating system comprises an oil separator tank 30 which contains a vertically disposed system of substantially horizontal plates or baffles, indicated generally at 32 in FIGS. 2 and 3, mounted on a base assembly 34 in turn mounted on the bottom of tank 30. The individual plates 36 of the assembly 32 are positioned in vertical spaced relation to each other by means of a plurality of vertical spacers 38 bolted as indicated at 40 to the base assembly 34. It will be seen that each of such horizontal plates 36 has a vertically disposed flange 41 along one longitudinal edge and a vertical flange 42 of less height than the first flange along its opposite longitudinal edge. The adjacent descending plates are offset one from the other, as best seen in FIG. 2, with the flange 41 of greater height of an adjacent lower plate being offset outwardly from the adjacent longitudinal edge of the next higher plate, the flange 42 of such higher plate being disposed adjacent said flange 41 of the adjacent lower plate.

By means of this staggered and offset arrangement of the adjacent vertically disposed horizontal plates and side flanges in the oil separator tank 30 of the oil and gas separator system 28, it will be seen that when the oil and gas mixture which is introduced via line 22 onto the uppermost one of the plates 36 in the oil separator tank 30 reaches a depth on such upper plate equal to the height of the shorter flange 42 on such plate, it then overflows onto the plate below. In this manner the oil and gas mixture cascades from one plate to the next lower plate and so on until it overflows the lowest plate of the system and passes through the connection 44 into an oil reservoir tank 45 below. During the cascading flow of the oil and gas mixture from the top plate to the bottom plate of the plates 36 in the oil separator tank 30, the oil is progressively stripped of gas bubbles therein and the equipment is designed so that the oil which overflows the lowest plate 36 and passes by gravity into the oil reservoir tank 45 is substantially free of gas. The oil in the reservoir tank 45 is then circulated via line 46 past a check valve 47 preventing return of the oil to the oil reservoir tank, and pumped by means of the oil feed pump 48, into the bearing units 12 and 16 of the turbine and compressor assembly. The gas separated from the oil in the separator tank 30 is returned via line 49 to scavenge oil cavity 20, or passes to a gas holder 64 provided in the system, in the manner described more fully below.

As an additional feature of the system of the invention, there is also provided an oil filler tank 50 mounted above the oil separator tank 30, with a connection 52 from the bottom of the filler tank to the top of the oil separator tank. There is also provided a pressure equalizing line 54 between the oil separator tank and the oil filler tank, and a vent line 56 from the filler tank. The oil passage line 52 between the two tanks is provided with a valve 53 and also the pressure equalizing line 54 contains a valve 55 and the vent line 56 is also provided with a valve 57.

When valves 53 and 55 are closed and valve 57 is open to vent the oil filler tank to the atmosphere, this permits filling of the filler tank with oil through the filler hole 58, while the system remains under pressure, e.g., of the order of about 200 p.s.i. When the vent valve 57 is closed and the valve 55 in the pressure equalizing line is opened, this pressurizes the filler tank. When the valve 53 in the oil flow line is then opened, oil flows by gravity from the filler tank to the oil separator tank. During normal operation of the system the three valves 53, 55 and 57 in the oil filler system remain closed.

In normal operation of the lubrication system, the pressure in the scavenge cavity 20 is maintained at a value less than that in the balance cavities 60 located on the opposite sides of the bearings 12 and 16 and their associated seals (not shown). Preferably, the differential pressure between the balance cavities and scavenge cavity is maintained greater than a predetermined minimum, for example, greater than about 10 p.s.i. Under these conditions, it is assured that oil and gas are drawn from the bearings into the scavenge cavity and not into the balance cavities, so that the lubricating oil does not become mixed with the gaseous working medium, e.g., helium, passing through the turbine and compressor.

The reduced pressure in the oil scavenge cavity 20 required to maintain the above noted differential pressure, is provided by means of a system including a line 62 which communicates at one end with the scavenge cavity and at its other end with the gas holder 64. A valve 65 actuated for opening by means of a pressure switch 66, as indicated by dotted line 66′, is provided in line 62, and there is also provided in such line a check valve 67 permitting flow of gas only from the scavenge cavity to the gas holder and not in the opposite direction. The gas holder 64 has an outlet line 68 in which is located a normally closed, e.g., solenoid valve 70 and a check valve 71 preventing passage of air into the system. The gas holder communicates with the inlet of a scavenge gas compressor 74 and such compressor exhausts the compressed gas to a gas cleaner 75, from which the gas is recirculated via line 76 to the turbo-machinery system, e.g., to the compressor 14.

It will be seen that the interior of the oil separator tank is connected via line 49 to the pressure balancing line 62 at a point upstream of the normally closed valve 65 in such line, so that gas, e.g., helium gas, stripped from the oil in the oil separator tank as described above, can be recirculated to the oil scavenge cavity 20 via lines 49 and 62. To maintain a predetermined minimum differential pressure between the balance cavities 60 and the scavenge cavity 20, as noted above, the pressure switch 66 communicates on one side via line 62 with the scavenge cavity, and on its other side via line 77 with a balance cavity.

Another pressure switch 80 is connected on one side via line 81 with the gas holder 64 and its other side is connected to the zone within the interior of the oil separating tank 30 via the line 82. This pressure switch senses the differential pressure between the gas holder and the interior of the oil separator tank, and actuates the scavenge gas compressor 74, as indicated by dotted line 83.

The first pressure switch 66 senses the differential pressure between the balance cavities 60 and scavenge oil cavity 20, and is set to close and to thereby actuate the valve 65 in the pressure balancing line 62 to open such valve when such differential pressure falls below a predetermined or set minimum differential pressure between the balance cavities and scavenge oil cavity, e.g., below about 10 p.s.i. differential pressure. The second pressure switch 80 senses the differential pressure between the gas holder 64 and the interior of the oil separator tank 30, and is set to actuate or place in operation the scavenge gas compressor 74 when the differential pressure between the oil separator tank and the gas holder falls below a predetermined or set minimum differential pressure, e.g., below about 10 p.s.i. differential pressure.

The above described system operates in the following manner. When the turbomachinery including the turbine 10 and compressor 14 is first placed in operation the pressure differential between the balance cavities 60 and the scavenge oil cavity 20, and the pressure differential between the oil separator tank 30 and the gas holder, in each case is below the minimum set differential pressure of pressure switch 66 and of pressure switch 80. Pressure switch 66 thus closes and actuates valve 65 in the pressure balancing line 62 to open such valve and provide communication between balance cavity 20 and gas holder 64. Also, pressure switch 80 closes and actuates to place the scavenge gas compressor 74 in operation to lower the pressure in scavenge oil cavity 20, and to create the differential pressure required to be maintained between the balance cavities and the scavenge oil cavity. When this pressure differential is established pressure switch 66 opens, and operates to close the valve 65. When the preset differential pressure between the oil separator tank 30 and the gas holder 64 is reached, the pressure switch 80 opens and actuates to turn off the scavenge gas compressor 74. However, it will be noted that the scavenge gas compressor may remain in operation for a period of time after the closing of valve 65.

Once the proper differential pressure between the balance cavities 60 and the scavenge cavity 20 is established, the scavenge oil cavity pressure will remain essentially constant until there is a leakage of gas through the bearings 12 and 16 and the associated seals, into the scavenge oil cavity, which generally occurs during a period of normal operation. If such leakage of gas is sufficiently great that such differential pressure, as previously noted, drops to a level below the predetermined minimum differential pressure as set by the pressure switch 66, such switch closes and actuates to open the valve 65, and gas from the scavenge oil cavity 20 and also from the oil separator tank 30, passes into the gas holder 64 until the pressure differential between the balance cavities and the scavenge oil cavity again increases to a value above the set minimum value. The pressure switch 66 then opens and thus actuates to close the valve 65, shutting off flow of gas to the gas holder.

Such intermittent flow of gas from the scavenge cavity to the gas holder can continue until the gas holder pressure rises to attain a value such that the differential pressure between the oil separator tank 30, which corresponds approximately to the pressure in the scavenge oil cavity 20, and the gas holder decreases below the minimum differntial pressure set by the pressure switch 80. At this time the latter switch closes, causing the scavenge gas compressor 74 to go into operation to withdraw gas from the gas holder 64 and to discharge same into the gas cleaner 75 from which the gas recirculates via line 76 to the turbomachinery system, e.g. to the compressor inlet of the system. When the differential pressure between the gas holder and the oil separaor tank is again increased in this manner to a value about the predetermined set minimum, the pressure switch 80 opens, and shuts off the scavenge gas compressor.

An emergency lubrication feature is provided in the system shown in FIG. 1. Such emergency system comprises a by-pass line 86 connected to the oil scavenging line 22 at a point therein upstream of the scavenge oil pump 24, the opposite end of this by-pass being connected to the pressure balancing line 62 at a point therein downstream of valves 65 and 67. There is also provided a second by-pass 88 in the oil feed line 46, such by-pass being connected across the oil feed pump 48 and the check valve 47. In the first by-pass line 86, there is provided a solenoid valve 89 and a check valve 90, preventing return flow of oil to the scavenge oil cavity 20, and in the second by-pass line 88 there is also provided a solenoid valve 91.

In normal operation of the lubrication system described above, wherein the scavenge oil pump 24, oil feed pump 48 and also the scavenge gas compressor 74 are all operating normally, the solenoid valve 70 at the outlet of the gas holder, and the solenoid valves 89 and 91 in the above noted by-pass lines 86 and 88, remain closed, all of the components 24, 48, 74, 70, 89 and 91 being connected in the usual way to a common power source. However, when a power failure occurs causing a sudden shutdown of the scavenge oil pump, the oil feed pump, and also the scavenge gas compressor, such power failure will also cause all three of the solenoid valves 70, 89 and 91 to open. Since the opening of the valve 70 at the outlet to the gas holder opens the system to atmospheric pressure, and the circulating oil lubrication system described above is normally under relatively high pressure, e.g., of the order of about 200 p.s.i., this causes the oil in the lower oil tank or reservoir tank 45 to be blown through the oil feed line 46 and by-pass line 88, thus by-passing the oil feed pump 48, into the bearings 12 and 16 of the turbomachinery, and then out of the scavenge oil cavity 20 and through the by-pass line 86, thus by-passing the scavenge oil pump 24, and is then vented through the vent 68 of the gas holder 64, to the atmosphere. This provides sufficient lubrication for the bearings 12 and 16 for a period sufficient to shut off and to bring the turbomachinery to rest position. Although this discharge of the lubricating oil to the atmosphere also results in the venting of working gas, e.g., helium, to the atmosphere, and therefore results in some economic loss, the chief advantage of this emergency oil lubrication system is that it prevents major damage to the turbomachinery in terms of bearing failure or seizure and possible twisting of the shaft and also heat damage.

Although the use of a scavenge oil pump such as 24 is preferred for efficient circulation of the oil in the lubricating system as described above, since the scavenge oil cavity pressure, and the pressure in the oil separator tank 30 and in the oil reservoir tank 45 are approximately equal, if the oil separator tank 30 is located sufficiently below the position of the scavenge oil cavity 20, the oil and gas mixture collected in the scavenge oil cavity 20 can flow by gravity through the scavenge oil line 22 to the oil separator tank, without employing the scavenge oil pump. Hence, if desired, and under conditions such as noted above, the scavenge oil pump 24 may be omitted from the system.

It will be understood that since the pressure in the oil separator tank 30 is substantially the same as the pressure in the scavenge oil cavity 20, if desired, line 82 from one side of the pressure switch 80 can be connected to the scavenge oil cavity instead of to tank 30. Thus, in any event, pressure switch 80 in effect senses the differential pressure between the scavenge oil cavity 20 and the gas holder 64.

From the foregoing, it is seen that the invention provides an efficient oil lubrication system for turbomachinery, having a number of valuable features including the efficient separation of working gas from the lubricating oil, prevention of loss of expensive working fluids such as helium to the atmosphere, prevention of contamination of the working medium by the lubricating fluid, preventing a high concentration of gas in the scavenge oil cavities, and also provides an emergency lubrication system to prevent extensive damage to the turbomachinery in the event of a power failure causing the oil pumps to stop functioning.

It will be understood that various modifications and adaptations of the invention can be made by those skilled in the art without departing from the spirit of the invention, and accordingly the invention is not to be taken as limited except by the scope of the appended claims.

We claim:

1. An oil lubrication system for the bearings of turbomachinery operating with a gaseous medium, said lubrication system being pressurized and normally operating in a closed circuit, comprising a scavenge oil cavity adjacent one side of a bearing of said turbomachinery, a balance cavity adjacent the other side of said bearing, means maintaining the pressure in said scavenge oil cavity below the pressure in said balance cavity, to cause flow of oil and gas from said bearing to said scavenge cavity, means for separating gas bubbles from a mixture of oil and gas, a first means for conducting a mixture of oil and gas under pressure from said scavenge oil cavity to said separating means, and a second means for conducting said separated oil substantially free of gas bubbles, under pressure from said separating means to the bearings of said turbomachinery, said first mentioned means including means for sensing the differential pressure between said balance cavity and said scavenge oil cavity, means for withdrawing gas from said scavenge oil cavity, means associated with said sensing means and said gas withdrawal means to control removal of gas from said scavenge oil cavity and reduction of pressure therein in response to a pressure differential below a predetermined minimum pressure differential, between said balance cavity and said scavenge oil cavity, means communicating with said gas withdrawal means for collecting gas so removed from said scavenge oil cavity, means for intermittently withdrawing gas from said gas collecting means, means for recirculating said gas to said turbomachinery, means for sensing the approximate differential pressure between said scavenge oil cavity and said gas collecting means, means associated with said last mentioned sensing means and said intermittent gas withdrawing means, to permit actuation thereof for removal of gas from said gas collecting means, in response to a pressure differential below a predetermined minimum differential pressure, between said scavenge oil cavity and said gas collecting means.

2. An oil lubrication system as defined in claim 1, said sensing means including a pressure switch arranged to sense the differential pressure between said balance cavity and said scavenge oil cavity, said means associated with said sensing means and said gas withdrawal means being a valve means in said gas withdrawal means and connected to said pressure switch for actuation thereby to open said valve means and to permit said removal of gas from said scavenge oil cavity.

3. An oil lubrication system for the bearings of turbomachinery operating with a gaseous medium, said lubrication system being pressurized and normally operating in a closed circuit, comprising a scavenge oil cavity adjacent one side of a bearing of said turbomachinery, a balance cavity adjacent the other side of said bearing, means maintaining the pressure in said scavenge oil cavity below the pressure in said balance cavity, to cause flow of oil and gas from said bearing to said scavenge cavity, means for separating gas bubbles from a mixture of oil and gas, a first means for conducting a mixture of oil and gas under pressure from said scavenge oil cavity to said separating means, and a second means for conducting said separated oil substantially free of gas bubbles, under pressure from said separating means to the bearings of said turbomachinery, said oil separating means comprising a separator tank containing a system of vertically disposed plates arranged to provide a cascading path of controlled flow of a mixture of oil and gas from one plate to an adjacent lower plate, a gas conduit means in communication with said separator tank and said scavenge oil cavity, permitting return flow of gas to said scavenge oil cavity, said first mentioned means including a pressure switch arranged to sense the differential pressure between said balance cavity and said scavenge oil cavity, conduit means for withdrawing gas from said scavenge oil cavity, valve means in said conduit means and connected to said pressure switch for actuation thereby to open said valve means and to permit removal of gas from said scavenge oil cavity and reduce the pressure therein in response to a pressure differential below a predetermined minimum pressure differential, between said balance cavity and said scavenge oil cavity, and means communicating with said conduit means for collecting gas so removed from said scavenge oil cavity, means for intermittently withdrawing gas from said gas collecting means, and means for recirculating said gas to said turbomachinery, said intermittent gas withdrawal means including a scavenge gas compressor, the inlet of said compressor communicating with said gas collecting means, a pressure switch arranged to sense the differential pressure between said separator tank and said gas collecting means, means for actuating said scavenge gas compressor, said pressure switch associated with said last mentioned actuating means for operating said compressor in response to a pressure differential below a predetermined minimum differential pressure between said separator tank and said gas collecting means.

4. An oil lubrication system for the bearings of turbomachinery operating with a gaseous medium, said lubrication system being pressurized and normally operating in a closed circuit, comprising a scavenge oil cavity in communication with one side of a bearing of said turbomachinery, a balance cavity in communication with the other side of said bearing, an oil and gas separator tank, a first conduit connecting said scavenge oil cavity and said separator tank, a scavenge oil pump in said first conduit for introducing an oil and gas mixture under pressure into said separator tank, a second conduit in communication with said separator tank and with a bearing of said turbomachinery, for conducting separated oil substantially free of gas bubbles from said separator tank to the bearings of said turbomachinery, an oil feed pump in said second conduit for maintaining a relatively high oil pressure in the oil lubrication system for said bearings, a third conduit connected at one end to said scavenge cavity, gas conduit means from said separator tank to said third conduit, a gas holder, said third conduit communicating with said gas holder, a compressor, a gas connection between said gas holder and the inlet to said compressor, a return conduit connecting the outlet of said compressor with the turbomachinery system for returning gas removed from said scavenge cavity via said gas holder, to said last mentioned system, a valve in said third conduit, said valve being positioned downstream from the connection of said conduit means from said separator tank with the third conduit, a first pressure switch, one side of said switch being in communication with said balance cavity and the opposite side of said switch being in communication with said scavenge oil cavity, said pressure switch being operatively connected with said valve for actuation thereof, said pressure switch being actuated when the differential pressure between the balance cavity and the scavenge oil cavity is reduced to a predetermined minimum value, to open said valve, a second pressure switch, one side of said switch being in communication with said gas holder and the other side of said last mentioned switch being in communication with said separator tank, said second pressure switch being operatively connected to said compressor for actuation thereof, said second switch being actuated when the differential pressure between said separator tank and said gas holder is reduced to a predetermined minimum value, to operate said compressor.

5. An oil lubrication system for the bearings of turbomachinery operating with a gaseous medium, said lubrication system being pressurized and normally operating in a closed circuit, comprising a scavenge oil cavity in communication with one side of a bearing of said turbomachinery, a balance cavity in communication with the other side of said bearing, an oil and gas separator tank, a first conduit connecting said scavenge oil cavity and said separator tank, a scavenge oil pump in said first conduit for introducing an oil and gas mixture under pressure into said separator tank, a second conduit in communication with said separator tank and with a bearing of said turbomachinery, for conducting separated oil substantially free of gas bubbles from said separator tank to the bearings of said turbomachinery, an oil feed pump in said second conduit for maintaining a relatively high oil pressure in the oil lubrication system for said bearings, a third conduit connected at one end to said scavenge cavity, gas conduit means from said separator tank to said third conduit, a gas holder, said third conduit communicating with said gas holder, a compressor, a gas connection between said gas holder and the inlet to said compressor, a return conduit connecting the outlet of said compressor with the turbomachinery system for returning gas removed from said scavenge cavity via said gas holder to said last mentioned system, a first by-pass connected to said first conduit upstream from said scavenge oil pump, and connected at its other end to said third conduit, a first valve in said first by-pass conduit, a second by-pass conduit across said oil feed pump in said second conduit, a second valve in said second by-pass, a third valve in said third conduit, said third valve being positioned downstream from the connection of said conduit means from said separator tank with the third conduit, and upstream of the connection of said first by-pass conduit with said third conduit, an outlet from said gas holder to the ambient atmosphere, a fourth valve in said outlet, said first, second, third and fourth valves being normally in closed position, means opening said first, second and fourth valves on failure of power to said scavenge oil pump and to said oil feed pump, a first pressure switch, one side of said switch being in communication with said balance cavity and the opposite side of said switch being in communication with said scavenge oil cavity, said pressure switch being operatively connected with said third valve for actuation thereof, said pressure switch being actuated when the differential pressure between the balance cavity and the scavenge oil cavity is reduced to a predetermined minimum value to open said third valve, a second pressure switch, one side of said switch being in communication with said gas holder and the other side of said last mentioned switch being in communication with said separator tank, said second pressure switch being operatively connected to said compressor for actuation thereof, said second switch being actuated when the differential pressure between said separator tank and said gas holder is reduced to a predetermined minimum value, to operate said compressor.

6. An oil lubrication system as defined in claim 5, said separator tank containing a system of vertically disposed plates providing a cascading path of controlled flow of a mixture of oil and gas introduced onto said plates, a reservoir tank disposed below said separator tank and in communication therewith, for flow of oil from said separator tank to said reservoir tank, said second conduit being in communication with said reservoir tank, a filler tank disposed above said separator tank, a valve controlled gravity flow connection between said filler tank and said separator tank, a second valve controlled connection between the filler tank and said separator tank for equalizing the pressure in said tanks, a valve controlled outlet from said filler tank to the ambient atmosphere, and a filler hole in said filler tank.

7. An oil lubrication system for the bearings of turbomachinery operating with a gaseous medium, said lubrication system being pressurized and normally operating in a closed circuit, comprising a scavenge oil cavity adjacent one side of a bearing of said turbomachinery, a balance cavity adjacent the other side of said bearing, means maintaining the pressure in said scavenge oil cavity below the pressure in said balance cavity, to cause flow of oil and gas from said bearing to said scavenge cavity, means for separating gas bubbles from a mixture of oil and gas, a first means for conducting a mixture of oil and gas under pressure from said scavenge oil cavity to said separating means, and a second means for conducting said separated oil substantially free of gas bubbles, under pressure from said separating means to the bearings of said turbomachinery, said second conducting means including a pump means, a first pressure release by-pass means in communication with said first conducting means, said first pressure release means by-passing said separating means and said second conducting means, a first valve means in said by-pass means, an outlet conduit connected to said bypass means, and communicating with the external ambient atmosphere, a second pressure release by-pass means in communication with said second conducting means, said second pressure release means by-passing said pump means, a second valve means in said second by-pass means, said first and second valve means being operative in response to a pressure failure in said first conducting means and in said second conducting means, to open said first by-pass means and to open said second by-pass means, and permit flow of oil from said oil separating means through said bearings, said scavenge cavity and said outlet conduit.

8. An oil lubrication system for the bearings of turbomachinery operating with a gaseous medium, said lubrication system being pressurized and normally operating in a closed circuit, comprising a scavenge oil cavity adjacent one side of a bearing of said turbomachinery, a balance cavity adjacent the other side of said bearing, means maintaining the pressure in said scavenge oil cavity below the pressure in said balance cavity, to cause flow of oil and gas from said bearing to said scavenge cavity, means for separating gas bubbles from a mixture of oil and gas, a first means for conducting a mixture of oil and gas under pressure from said scavenge oil cavity to said separating means, and a second means for conducting said separated oil substantially free of gas bubbles, under pressure from said separating means to the bearings of said turbomachinery, a first pump means in said first conducting means, a second pump means in said second conducting means, a first by-pass conduit in communication with said first conducting means, said first by-pass conduit by-passing said first pump means, said separating means and said second conducting means, a first normally closed solenoid valve in said first by-pass conduit, an outlet conduit connected to said first by-pass conduit, and communicating with the external ambient atmosphere, a second by-pass conduit in communication with said second conducting means, and connected across said second pump means, a second normally closed solenoid valve in said second by-pass conduit, said first and second valves being opened in response to a power failure interrupting operation of said first and second pump means, to permit flow of oil from said oil separating means through said bearings, said scavenge cavity and said outlet conduit, via said second and first by-pass conduits, respectively.

References Cited

UNITED STATES PATENTS

| | | | |
|---|---|---|---|
| 760,072 | 5/1904 | Keyes | 137—169 |
| 1,317,688 | 10/1919 | Davenport | 55—186 X |
| 1,867,236 | 7/1932 | Van Rijswijk | 277—3 |
| 2,485,447 | 10/1949 | Keller | 230—204 X |
| 2,660,367 | 11/1953 | Ehlinger | 230—204 |

FOREIGN PATENTS 802,861  10/1958  Great Britain.

LAVERNE D. GEIGER, *Primary Examiner.*

SAMUEL ROTHBERG, *Examiner.*

E. J. EARLS, *Assistant Examiner.*